United States Patent [19]
Harris

[11] Patent Number: 5,170,773
[45] Date of Patent: Dec. 15, 1992

[54] SPACE HEATING UNIT FOR RECREATIONAL VEHICLES

[76] Inventor: Herbert A. Harris, 1079 Avenue B, Space 31, Yuma, Ariz. 85364

[21] Appl. No.: 789,654

[22] Filed: Nov. 8, 1991

[51] Int. Cl.$^5$ .............................................. F24C 1/14
[52] U.S. Cl. .......................................... 126/6; 126/4; 126/90 R; 126/72; 126/67; 126/248; 237/30
[58] Field of Search ............. 126/3, 4, 6, 39 A, 90 R, 126/72, 67, 248; 165/901; 237/28, 29, 30, 31

[56] References Cited

U.S. PATENT DOCUMENTS

| | | |
|---|---|---|
| 321,400 | 6/1885 | Turner . |
| 530,640 | 12/1894 | Guy . |
| 1,286,270 | 12/1918 | Forbes .................................... 126/6 |
| 1,402,728 | 1/1922 | Cassady . |
| 1,624,080 | 4/1927 | Sullivan . |
| 2,088,280 | 7/1937 | Schillinger ........................... 126/248 |
| 2,472,198 | 6/1949 | Dufault .................................... 126/6 |
| 2,553,278 | 5/1951 | Rogant .................................... 126/6 |
| 3,139,879 | 7/1964 | Bauer et al. ............................. 126/4 |
| 3,280,813 | 10/1966 | Schaenzer ............................... 126/4 |
| 3,358,670 | 12/1967 | Osborne ............................. 126/6 X |
| 3,509,869 | 5/1970 | Woods ................................. 126/248 |
| 4,425,901 | 1/1984 | Callison .................................. 126/4 |
| 4,630,592 | 12/1986 | Larabie .................................. 126/4 |
| 4,848,310 | 7/1989 | Millington .............................. 126/4 |
| 4,972,823 | 11/1990 | Stadin .................................... 126/4 |

FOREIGN PATENT DOCUMENTS 3307342 6/1984 Fed. Rep. of Germany .

Primary Examiner—Larry Jones
Attorney, Agent, or Firm—John E. Reilly

[57] ABSTRACT

A space heating unit is designed for use in a recreational vehicle and particularly to operate in conjunction with a cooking stove wherein the heating unit has a housing which is placed over a pair of burners and air flow ducts extend across the housing above the burners to draw air from the room upwardly through the ducts and across the housing in order to heat the air and discharge it into the room. The upper end of the housing communicates with an exhaust duct and has a baffle to regulate the rate of air flow through the housing.

8 Claims, 1 Drawing Sheet

SPACE HEATING UNIT FOR RECREATIONAL VEHICLES

This invention relates to heating devices; and more particularly relates to a novel and improved space heating unit which is particularly adaptable for use in recreational vehicles to provide an efficient, low cost source of heat and specifically in such a way that it can be employed in combination with a stove for space heating purposes.

BACKGROUND AND FIELD OF THE INVENTION

In recreational vehicles, space is at a premium and dictates the use of extremely compact appliances, utilities as well as built-in furniture to serve the needs of the occupants. Accordingly, anything that can be done to eliminate appliances or to permit appliances to serve a dual purpose is extremely important insofar as space conservation is concerned. In many climates, such as, the Southwestern region of the United States, temperatures do not drop so drastically as to require a separate furnace installation. Nevertheless, there are times when the temperature drop is such that a space heating source is necessary to maintain the temperature at a comfortable level, particularly at night.

In the past, it has been proposed to utilize the burners on a cookstove for space heating purposes and various attachments have been devised to this end. For example, U.S. Pat. No. 2,553,278 to H. R. Rogant employs a unit which can be placed on a stove and directly over the burners for space heating purposes but requires a fan or blower which is controlled by a thermostat to turn on only when the temperature level in the unit drops below a predetermined temperature. U.S. Pat. No. 530,640 to J. Guy also discloses a heating attachment for gas cooking stoves including a pair of tubes which will connect into a common outlet or discharge; also, U.S. Pat. No. 321,400 to L. W. Turner discloses a heating unit which can be placed over the burner opening in the stove and has a discharge pipe that will connect up to a stack or other exhaust pipe. U.S. Pat. No. 2,088,280 to A. Schillinger also discloses a stove heating attachment in which a tubular section referred to as a back wall forms a channel for the passage of cool air to mix with hot gases from a discharge opening, and a flue pipe extends vertically through the center of the unit. Other representative patents are U.S. Pat. Nos. 1,402,728 to J. Cassady, 1,624,089 to F. D. Sullivan, 3,280,813 to G. N. Schaenzer, 3,509,869 to E. L. Woods, and 4,425,901 to G. Callison.

In the design and construction of heating units of the type described, it is important that the unit be accurately centered over the burners or other source of heated air so as to confine the upward movement of the heated air and fumes to the interior of the housing and, through an exhaust duct, to the exterior of the vehicle; also, that the air to be heated be drawn through the housing in such a manner as to absorb a maximum amount of heat from the interior of the housing and without any tendency to draw the fumes from the burner or other heat source out of the housing and into the room.

SUMMARY OF THE INVENTION

It is therefore an object of the present invention to provide for a novel and improved space heating unit which is highly efficient and reliable in operation, and is extremely lightweight, compact and low in cost.

It is another object of the present invention to provide in a recreational vehicle for a space heating unit which can be used in cooperation with the burners on a cook stove to efficiently heat the air within the vehicle and which avoids the use of any moving parts, is portable and easy to install.

It is a further object of the present invention to provide for a novel and improved space heating unit for use in combination with a cook stove in which the unit can be accurately aligned in position with one or more burners and recover a maximum amount of heat from the burners heating room air while at the same time avoiding escape of fumes into the room.

It is a still further object of the present invention to provide for a novel and improved space heating unit comprised of a minimum number of parts and which employs an improved air flow duct arrangement which will encourage the natural flow of air from the space therethrough and maximum absorption of heat into the air from the heat source for discharge back into the room.

In accordance with the present invention, a portable space heating unit has been devised for heating air in a room, said unit having a hollow housing including sidewalls and a bottom with an opening therein to receive heated air, open-ended air ducts extending through the housing for heating cool air from the space which passes inwardly through one end of the duct and is discharged through an opposite end of the duct. The space heating unit of the present invention is particularly adaptable for use in a recreational vehicle having a stove top provided with a plurality of burners and the bottom of the housing has at least one opening sized for placement over one or more of the burners, the air ducts extending across the housing and being spaced above the burners, each duct having a lower inlet adjacent to the bottom wall and an upper outlet adjacent to the top wall whereby heating of the air ducts will draw air from the room upwardly through the ducts and across the housing whereby to heat the air and discharge it into the room.

Another important feature of the invention resides in the use of locating pins in the bottom wall of the housing which are insertable into openings normally provided for the burner tops and which will accurately register or align the openings in the bottom wall with the burners. An adapter on the top wall of the housing facilitates connection to the exhaust duct in the recreational vehicle so as to create a draft for upward movement of the heated air generated by the burners past the air ducts and out through the exhaust.

The above and other objects of the present invention will become more readily appreciated and understood from a consideration of the following detailed description of a preferred embodiment when taken together with the accompanying drawings wherein:

DETAILED DESCRIPTION OF THE PREFERRED EMBODIMENT

Figure 1:
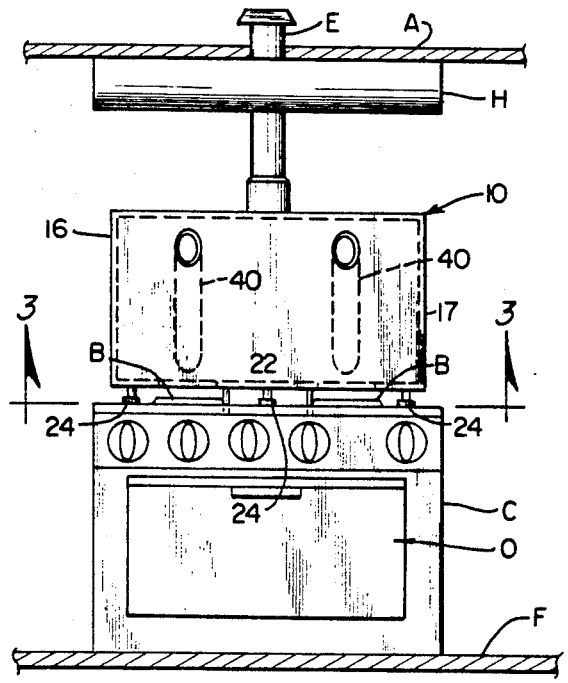
FIG. 1 is a front view in elevation of a preferred form of space heater unit mounted on a stove top and connected into the exhaust duct above the stove of a recreational vehicle.
Figure 2:
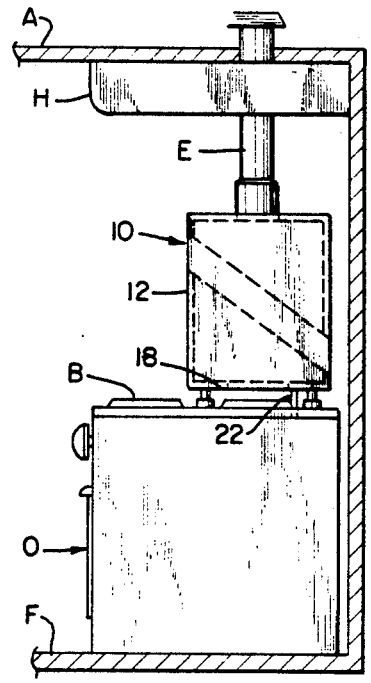
FIG. 2 is a side view in elevation of the preferred form of invention illustrated in FIG. 1.
Figure 3:
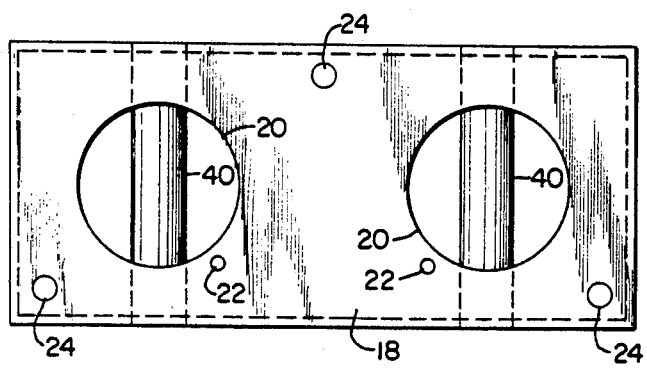
FIG. 3 is a cross-sectional view taken about lines 3—3 of FIG. 1.
Figure 4:
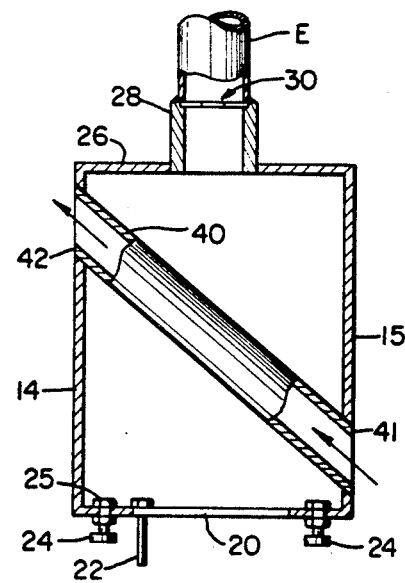
FIG. 4 is a vertical sectional view taken through the heater units with one of the ducts being shown partially in section.

Referring in more detail to the drawings, there is illustrated in FIGS. 1 to 4 a preferred form of space heater unit 10 and which in FIGS. 1 and 2 is shown mounted over a pair of burners B on the stove top o a conventional cooking stove C. As a setting for the present invention, the cooking stove C is typically of the type employed in recreational vehicles and comprises a set of four burners B with suitable controls D and oven area O, the stove resting on a floor surface F. A hood H is mounted above the stove and is shown affixed to a ceiling A with an exhaust stack E passing upwardly through the hood H and ceiling A to the outside of the vehicle.

The preferred form of heating unit 10 is comprised of a hollow housing 12 of generally rectangular configuration having vertical front and rear walls 14 and 15 and opposite sidewalls 16 and 17. A horizontal bottom wall 18 is joined to the lower edges of the vertical walls as described and is provided with a pair of openings 20 which are so spaced from one another and sized as to correspond with the size of the outer well or depression, not shown, which typically surrounds each burner. A locating pin 22 is positioned just outside of and forwardly of each opening 20 and which is insertable into the standard opening provided on the stove top adjacent to each burner well for placement of individual burner tops which are removed for substitution of the space heater unit. Accordingly, when the locating pins 22 are inserted into the openings adjacent to each burner, as illustrated in FIGS. 1 and 2, the openings 20 will be centered over a respective burner so that when the burner is ignited the flame will pass upwardly through the opening 20. Adjustable feet 24 are provided at each corner of the space heater unit and which, in accordance with conventional practice, can be threadedly adjusted with lock nuts 25 to level the heating unit with respect to the stove top.

Figure 5:
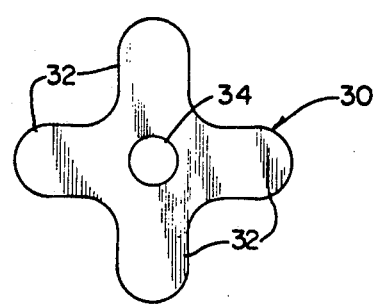
FIG. 5 is a plan view in detail of a baffle plate employed in cooperation with an exhaust duct to regulate the flow rate of air from the housing.

The housing 12 also includes a top horizontal wall 26 which includes a tubular adapter 28. The adapter includes a baffle plate 30, as shown in FIG. 5, which is positioned in the upper end of the adapter between the adapter and exhaust stack E to regulate the upward flow of air from the housing 12 into the exhaust stack E. Specifically, the baffle is in the form of a flat plate having side wings or extensions 32 which are firmly seated on the upper end of the adapter with a limited central opening 34 which is approximately one-half the diameter of the adapter 28 to somewhat restrict the flow rate of air upwardly through the exhaust duct.

In order to draw or create the natural flow of air from the room through the heating unit, air flow ducts in the form of open-ended tubular conduits or pipes 40 extend across the hollow interior of the housing between the rear wall 15 and front wall 14 and at an inclined angle directly above each of the burner openings 20. Thus, each pipe 40 has a lower inlet end 41 and upper discharge end 42 extending through the thicknesses of the respective walls 14 and 15, the lower end 41 being adjacent to but spaced above the bottom wall 18, and the upper discharge end 42 is adjacent to but spaced below the top wall 26. Preferably, the spacing of the inlet end 41 above the bottom wall is somewhat greater than the spacing of the discharge end 42 beneath the top wall so as to prevent fumes from being drawn from the burner through the openings 20 in the lower end of the housing and which would otherwise present a danger to occupants of the vehicle. It has been found that this problem is overcome by locating the lower ends of the air flow ducts so as to be spaced above the bottom wall of the housing. For example, in a heating unit having a housing which is approximately 10" high and 8" deep and a length of 18", the lower end of the duct should be spaced approximately 2" above the lower edge or bottom wall of the housing. Furthermore, the upward inclination of the ducts across the housing will create a natural draft to induce the flow of air through the lower end 41 and discharge same through the upper end 42 without the use of fans, blowers, etc. Further, it will be appreciated that while the air ducts are shown extending across the narrow dimension of the housing, equally beneficial results can be achieved by extending the ducts across the longer dimension.

In use, the space heating unit of the present invention is preferably positioned over the rear burners, and accordingly the burner tops for the two rear burners are removed and the locating pins 22 inserted into the openings that are provided for the burner tops next to each burner. In this way, the openings 20 are accurately centered over the burner openings. If necessary, the heating unit is leveled by adjusting the feet 24, and the adapter 28 is connected into the exhaust duct E. When the burners are turned on, the heated air within the housing will rapidly heat up the air ducts 40 and, since the air ducts 40 are in open communication with the air in the room, will induce the air to flow upwardly at an acute angle across the housing of approximately 45° through the air ducts and become heated prior to discharge back into the room. The temperature of the heated air can be easily regulated by regulating the burners and the effective opening size of the baffle. Accordingly, the space heating unit can be used during daylight hours and will not interfere with the use of the other burners on the stove. Moreover, the unit can be utilized at night by adjusting the setting of the burners to the most comfortable temperature.

It is therefore to be understood that while a preferred form of invention has been herein set forth and described, various modifications and changes may be made therein without departing from the spirit and scope of the present invention as defined by the appended claims and reasonable equivalents thereof.

I claim:

1. In a space heater unit adapted for use in a recreational vehicle having a stove top provided with a plurality of burners in a room air space within the vehicle, said heater unit comprising:

a hollow housing of generally rectangular configuration including vertical sidewalls, a horizontal top wall having an exhaust duct extending upwardly therefrom, and a bottom wall having at least one opening therein sized for placement over a plurality of said burners, air flow ducts extending across said housing and being spaced above each of said burners, each said duct having a lower inlet through one of said walls adjacent to said bottom wall and an upper outlet through an opposite wall adjacent to said top wall whereby heating of said air ducts will draw air from the room upwardly through said ducts in heat exchange relation to said ducts and discharge same into the room.

2. In a space heater unit according to claim 1, said ducts being of uniform diameter and extending across said housing between opposite of said walls in spaced relation to said burners.

3. In a space heater unit according to claim 2, said ducts extending at an angle of approximately 45° across said housing.

4. In a space heater unit according to claim 1, including an exhaust duct extending upwardly from said top wall of said housing and a baffle member positioned in said exhaust duct to restrict the upward flow of air through said housing.

5. In a space heater unit adapted for use in a recreational vehicle having a stove top in a room air space within the vehicle provided with a plurality of burners and a plurality of openings in said stove top surrounding the burners said heater unit comprising:

a hollow housing including sidewalls, a top wall and an exhaust duct, and a bottom wall having at least one opening therein sized for placement over at least one of said burners, air flow ducts extending at upward angles across said housing and being spaced above each of said burners, each said duct having a lower inlet through one of said sidewalls adjacent to said bottom wall and an upper outlet through an opposite sidewall adjacent to said top wall whereby heating of said air ducts will draw air from the room upwardly through said ducts in heat exchange relation to said ducts and discharge same into the room said exhaust duct extends from said top wall and through an exterior wall of the vehicle, and;

said bottom wall further including locating pins insertable into said openings surrounding said burners.

6. A portable space heating unit according to claim 5, including a pair of openings in said bottom of said housing, each of said openings sized to fit over one of said burners in said stove top.

7. A portable space heating unit according to claim 5, said air ducts means being in the form of a plurality of tubular conduits, said conduits open at opposite ends and extending through opposite of said sidewalls of said housing.

8. A portable space heating unit according to claim 7, said tubular conduits extending at an acute angle across the hollow interior of said housing whereby said air duct means is operative in response to being heated by the heated air rising through said opening in said bottom to encourage the upward flow of air from said space through said tubular conduits.

* * * * *